United States Patent [19]

Barnett

[11] 4,057,283
[45] Nov. 8, 1977

[54] MOTORCYCLE TRAILER

[75] Inventor: David L. Barnett, Phoenix, Ariz.

[73] Assignee: Robert L. Howard, Phoenix, Ariz.

[21] Appl. No.: 590,446

[22] Filed: June 26, 1975

[51] Int. Cl.$^2$ .............................................. B60P 3/34
[52] U.S. Cl. .................................... 296/23 C; 190/2;
220/4 E; 135/1 A; 135/4 A; 280/204
[58] Field of Search .......... 280/204; 296/23 A, 23 R,
296/23 C; 190/2; 220/4 E; 135/1 A, 4 R, 4 A

[56] References Cited

U.S. PATENT DOCUMENTS

| 2,168,661 | 8/1939 | Anderson | 296/23 R |
|---|---|---|---|
| 2,212,958 | 8/1940 | Rea | 280/204 |
| 2,225,993 | 12/1940 | Hornberger | 296/23 R |
| 2,576,935 | 12/1951 | Hayes | 280/715 X |
| 2,643,395 | 6/1953 | Stassinos | 296/23 R |
| 2,920,802 | 1/1960 | Cook | 190/19 X |
| 3,410,598 | 11/1968 | Davis | 296/23 R |
| 3,582,131 | 6/1971 | Brown | 296/27 |
| 3,788,670 | 1/1974 | Petersen | 296/23 A |
| 3,823,975 | 7/1974 | Cooper | 296/23 R |
| 3,843,164 | 10/1974 | Flegel | 280/204 X |

FOREIGN PATENT DOCUMENTS

| 1,362,610 | 4/1964 | France | 296/23 R |
|---|---|---|---|
| 1,289,444 | 2/1969 | Germany | 296/23 R |
| 449,930 | 6/1949 | Italy | 280/204 |
| 411,284 | 6/1934 | United Kingdom | 190/2 |

Primary Examiner—John P. Silverstrim
Attorney, Agent, or Firm—John A. Robertson

[57] ABSTRACT

A motorcycle trailer comprising two body parts hingedly connected with each part having triangular sides and a rear wall on the upper part. A wheel suspension is secured to the lower part and comprises a pair of leaf springs having a transverse tubular member secured to their lower ends and a pair of shock absorbers between the tubular member and the lower body part. A pair of wheels are mounted on spindles at the ends of the tubular member. A pair of link assemblies hold the upper body part in an open position at an acute angle. A bed comprising two parts hingedly connected is positioned in the lower body part. With the bed in open position the part extending from the lower body part is supported by a pair of U shaped frames pivoted to the underside of that part. A canopy is supported by the partially open upper body part and a collapsible frame. A universal hitch is provided for attaching the trailer to the luggage rack of a motorcycle.

9 Claims, 13 Drawing Figures

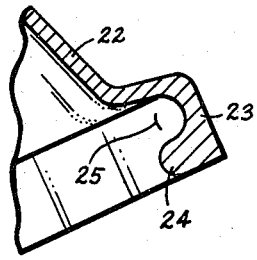
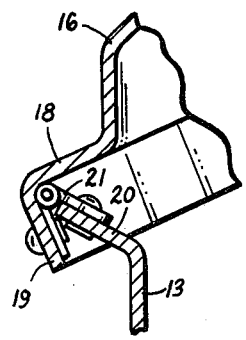
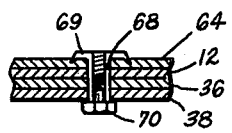
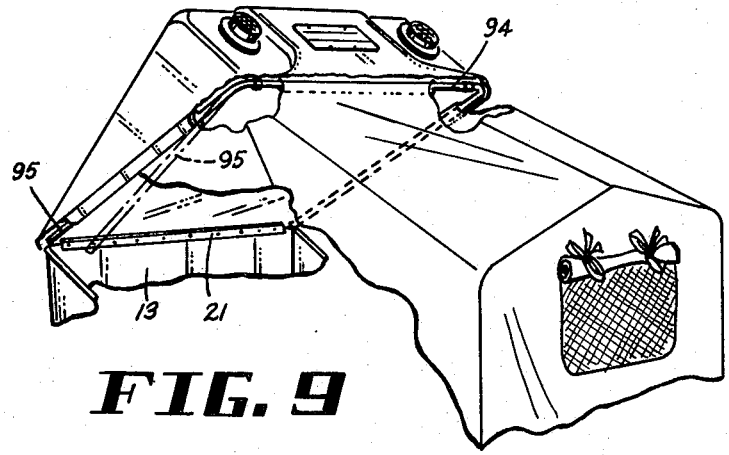
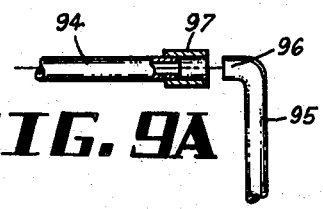
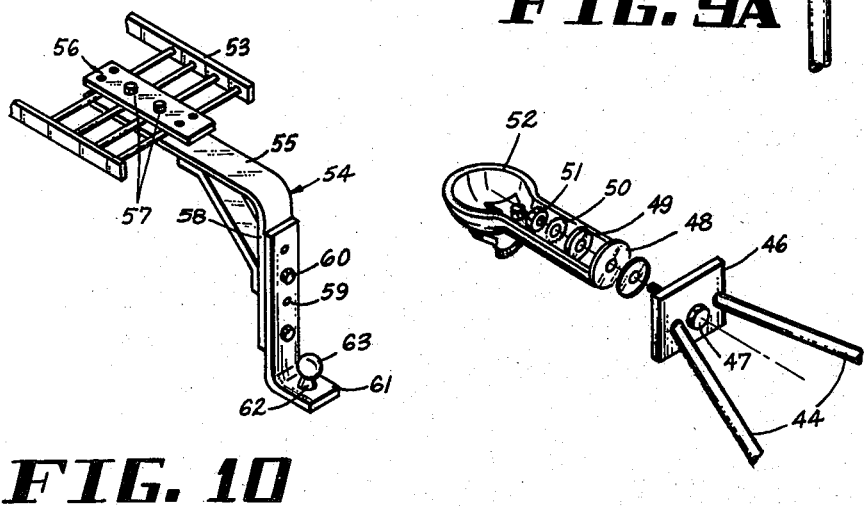

MOTORCYCLE TRAILER

The present invention relates to a motorcycle trailer and is concerned primarily with the novel construction of the body of such a trailer.

BACKGROUND OF THE INVENTION

At the present time the use of motorcycles is becoming more and more widespread, not only in the U.S. but in many foreign countries. It is believed that this trend may be attributed to the energy crisis. Coincidental with this trend, the public is now becoming conscious of the desirability of stopping at parks or other outdoor areas for resting and sleeping purposes. Thus, the desirability of a trailer for a motorcycle which will provide sleeping facilities is on the upturn so far as public acceptance is concerned.

Broadly speaking, motorcycle trailers are known. Moreover there is, in the known art, at least one example of a motorcycle trailer which provides sleeping facilities. Thus, in U.S. Pat. No. 3,823,975 there is disclosed a motorcycle trailer including a body comprising upper and lower box-like parts with the lower part including a tailgate which is hingedly mounted thereon. Mechanism is provided for holding the upper box-like part in a partially opened or inclined position in the form of a detachable connection between the tongue of the hitch and the center of the upper box-like member.

This known trailer body presents certain undesirable features. In the first place the mechanism for holding the upper box-like part in an open position is unstable. Moreover, the necessity of a hingedly mounted tailgate renders the structure unduly complex, and finally, the configuration of the box-like parts impairs the access to the interior of the body when the latter is open.

In the trailer of the aforesaid patent, each of a pair of wheels is individually supported by a leaf spring. This mode of wheel suspension has been found to be highly unstable and does not provide the roadability required of a motorcycle trailer. The structure for supporting a canopy in an erected position is unduly complex and is undesirable from other aspects.

When a trailer is being towed by a motorcycle it is highly important that the hitch which connects the two be capable of accommodating pronounced cant or tilt of the motorcycle which is created as the cycle makes a sharp turn, at the same time leaving both of the wheels of the trailer on the road surface.

OBJECTS OF THE INVENTION

With the foregoing conditions in mind the present invention has in view the following objectives:

1. To provide a motorcycle trailer including a body comprising upper and lower parts which are hingedly connected and which are the epitome of simplicity and which at the same time afford improved access to the interior of the body when the upper part is in a partially opened position.

2. To provide, in a motorcycle trailer of the type noted, a two part trailer body which does not include a hingedly mounted tailgate.

3. To provide, in a motorcycle trailer of the character aforesaid, a two part trailer body in which the lower part has side walls providing rearwardly inclined top edges and the upper part includes side walls presenting upwardly inclined lower edges which are complemental to the inclined edges of the side walls of the lower part.

4. To provide, in a motorcycle trailer of the kind described, a new and improved wheel suspension.

5. To provide, in a motorcycle trailer of the type noted, new and improved mechanism for maintaining the upper body part in a partially opened or inclined position.

6. To provide, in a motorcycle trailer of the character aforesaid, a bed comprising two members of the same size and shape which are hingedly connected with one of said members conforming to the shape of the bottom of the lower body part to which it is secured and leg structure for supporting the other bed member when it is swung rearwardly away from the bed member secured to the body bottom.

7. To provide, in a motorcycle trailer of the type noted, new and improved collapsable frame structure for supporting a canopy.

8. To provide, in a motorcycle trailer of the character aforesaid, a hitch which is particularly adapted for connection to the luggage rack of a motorcycle and which includes a universal joint which is capable of accommodating a wide swing of the motorcycle and relative to the trailer by including a horizontal pivot which would permit these two members to turn a full 360° relative to one another.

Various other more detailed objects and advantages of the invention, such as arise in connection with carrying out the above ideas in a practical embodiment, will, in part, become apparent and, in part, be hereinafter stated as the description of the invention proceeds.

SUMMARY OF THE INVENTION

The foregoing objectives are achieved by providing a motorcycle trailer which includes as a characteristic and essential element a two part body. This body comprises a lower part consisting of a floor having a free rear edge and a front wall upstanding from its front edge and presenting an upper edge. A pair of triangularly shaped side walls extending between side edges of the front wall and the ends of the rear free edge of the bottom. These side walls present upper inclined edges. An upper body part consisting of a top having a front edge which is hingedly connected to the upper edge of the front wall of the bottom body part. A rear wall depends from the rear edge of the top and side walls extend from the rear wall to the ends of the front edge of the top wall. These side walls present lower inclined edges which are complemental to the upper inclined edges of the side walls of the bottom part. A seal is provided between each of these pair of complemental edges when they meet as when the body is closed.

Mechanism for holding the upper body part in a partially opened or inclined position takes the form of two link assemblies each of which is located on one side of the body. Each link assembly consists of a lower link having its lower end pivoted to a side wall of the lower body part with its upper end being pivoted to an upper link the upper edge of which is pivoted to the side wall of the upper body part. A sleeve is slideably mounted on the upper link and when the two links align, which condition occurs when the upper body part has been opened to its limit of movement, this sleeve is slid down over the hinge connection between the two links.

A pair of channel bars are arranged longitudinally in spaced relation and secured to the underside of the bottom of the lower body part. The wheel suspension is secured to these channel bars and comprise a pair of leaf springs each having its upper end secured to a channel member and its lower end to a transverse rod having a spindle at each end. A pair of shock absorbers are interposed between this rod and the channel members. A wheel is journaled on each of these spindles.

A trailer which is provided in the form of an L shaped bracket. The upper horizontal arm of which is attached to the luggage rack of a motorcycle. A second L shaped member is secured to the vertical arm of the aforesaid L shaped member and includes a lower horizontal tab on which is mounted a stud having a semispherical end. A pair of struts have their rear ends connected to the channel bars and extend forwardly therefrom in converging relation with their front ends being secured to a vertical plate. A semi-cylindrical member is formed with a semi-spherical element at its front end which fits over the semi-spherical head of the stud. A horizontal pivot pin is anchored to the plate and extending through the semi-cylindrical member with a nut thereon securing the connection between this member and the plate. This horizontal pivot accommodates relative rotation between the motorcycle and the trailer through a full 360° while the ball joint provided by the semi-spherical head and element accommodates a limited amount of movement on a vertical pivot line.

A bed comprises two rectangularly shaped parts which are hingedly connected with each part being of the same size and shape as each other and the bottom of the lower body part. The front bed part is permanently secured to the bottom of the lower body part which it overlies in accurate conformity and the rear bed part is adapted to be swung upwardly and rearwardly to assume a horizontal position in alignment with the front bed part. When so positioned the rear bed part is supported by two U shaped side frames. Each of these frames comprises a back which engages the ground or other supporting surface and a pair of legs upstanding therefrom which are pivotally connected to the rear bed part. Releaseable braces are provided for each of these legs to prevent its inadvertent collapse.

A second generally U shaped frame comprising a top cross-bar in the shape of a wide V and a pair of legs which depend therefrom when this frame is in a vertical position. The lower ends of these legs are pivotally connected to the rear bed part at the ends of the rear edge thereof. Each of a pair of telescoping arms comprises an outer tube, one end of which is pivoted to a side wall of the upper body part, and an inner tube which is slideable therein and which is provided with a device at its outer free end for attaching it to an end of the V shaped cross-bar. When the body is closed, these telescoping arms are collapsed and swung inwardly into positions along the innerface of the side walls of the upper body part and secured in this position by a spring clasp.

A canopy is draped over the telescopic arms when extended and the frame with the V shaped cross-bar when the latter is erected. The canopy also includes portions which are secured to the lower inclined edges of the upper body part and extend over the lower body part. That portion of the canopy extending between the V shaped cross-bar and the lower edges of the rear wall of the top body part is secured in position by a tubular rod which is sewn into the material of the canopy and which is forced into an inwardly opening channel formed in the lower edge of the rear wall. The latter condition is achieved by a pair of thrust rods each of which has an inturned outer end which is forced into the tubular crossrod with a press fit, with its other end being forced into a corner defined by a side wall and the front wall of the upper body part.

For a full and more complete understanding of the invention, reference may be had to the following description and accompanying drawings wherein:

FIG. 7 is a detail taken on an enlarged scale and in section of the lower edge of the rear wall of the upper body part.

FIG. 8 is another detail section on an enlarged scale depicting the hinge connection between the body parts.

FIG. 9 is a perspective of the upper body part in open position and a portion of the canopy which is connected thereto.

FIG. 9A is a detail showing two elements of the canopy connection to the upper body part in exploded relation.

FIG. 10 is a detail perspective of a portion of the hitch looking at the upper side thereof.

FIG. 11 is another perspective of the other part of the hitch but looking at the underside thereof.

FIG. 12 is a detail section showing a spring, a channel bar, the body bottom, and the bed, as connected by a bolt.

DESCRIPTION OF A PREFERRED EMBODIMENT

While the subject trailer is designed primarily for use with motorcycles, it is to be clearly understood that it is also susceptible of use with other vehicles such as small automobiles and four-wheel drive overland vehicles. It is readily adaptable for such use by merely changing the hitch which, while a part of the present invention is not an essential element thereof.

Figure 1:
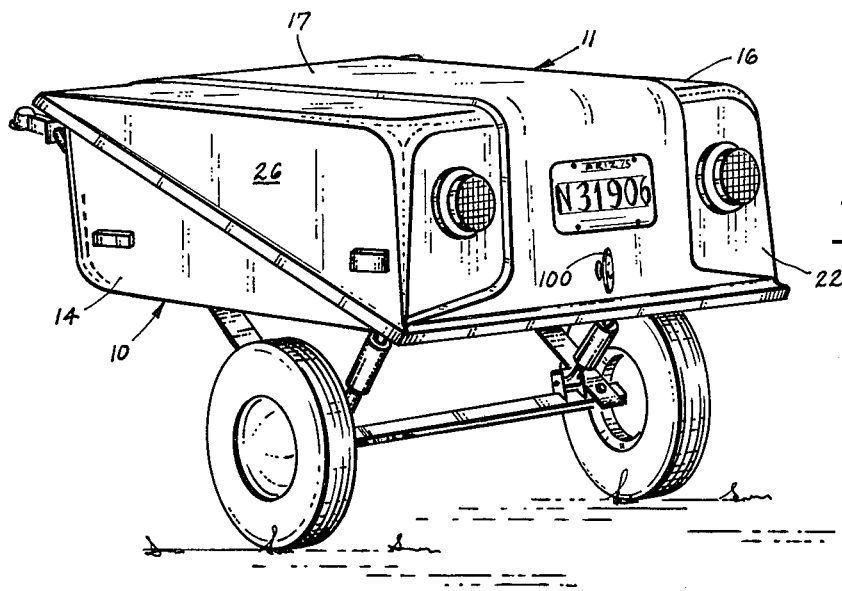
FIG. 1 is a perspective of the motorcycle trailer of this invention in closed condition.

Referring now to the drawings, and first more particularly to FIG. 1, the instant trailer is shown as including a body comprising a lower body part identified in its entirety at 10, and an upper body part designated generally 11. While these body parts may be made of any material which is susceptible of being fashioned into the desired shape, the invention has particularly in mind the use of a plastic such as fiber glass as the material for the body parts.

Lower body part 10 comprises a bottom 12 which is of rectangular shape and presents a free rear edge. Upstanding from the front edge of bottom 12 is a front wall 13 which preferably is integral with bottom 12. Side walls 14 upstand from the side edges of bottom 12 and extend between end edges of front wall 13 and the rear free edge. Side walls 14 are of triangular shape presenting upper edges 15 which are inclined downwardly and rearwardly from front wall 13.

Upper body part 11 comprises a top 16 which, while it may be flat is shown as being of an irregular formation including an up-raised longitudinal central strip 17 which lends strength and rigidity to the structure. Top 16 presents a rear edge portion 18 which is shown more clearly in FIG. 8 and which includes a downwardly and rearwardly directed flange 19 which is connected to a forwardly and upwardly directed flange 20 on front wall 13 of the lower body part by a hinge 21. Depending from the rear edge of top 16 is a rear wall 22 which is integral with top wall 16. Referring for the moment to FIG. 7, rear wall 22 has a lower edge portion 23 which terminates in an inturned lip 24 providing a channel 25. The function of this channel will be later described. Depending from the side edges of top 16 and extending between rear wall 22 to front edge portion 18 are side walls 26 of triangular shape. These side walls 26 present lower edges 27 which are inclined upwardly and forwardly from rear wall 22. Inclined edges 27 are complemental to inclined edges 15 on the bottom part which they meet when the body is closed. To provide a weather seal between these parts, the portions of side walls 26 immediately adjacent to edges 27 are slightly deformed to provide for an external overlap with those portions of side walls 14 immediately adjacent to edges 15.

To provide for the holding of upper body part 11 in an open or erected position in which top 16 is disposed at an acute angle with respect to bottom 12, two link assemblies each designated generally 28 are provided. Each of these link assemblies is mounted at one side of the body and comprises a lower link 29, the lower end of which is pivoted to side wall 14 closely adjacent to bottom 12 as indicated at 9 and an upper link 30 the lower end of which is pivotally connected to the upper end of link 29 as indicated at 31 and its upper end is pivoted to the inner face of a side wall 26 at 32.

Figure 3:
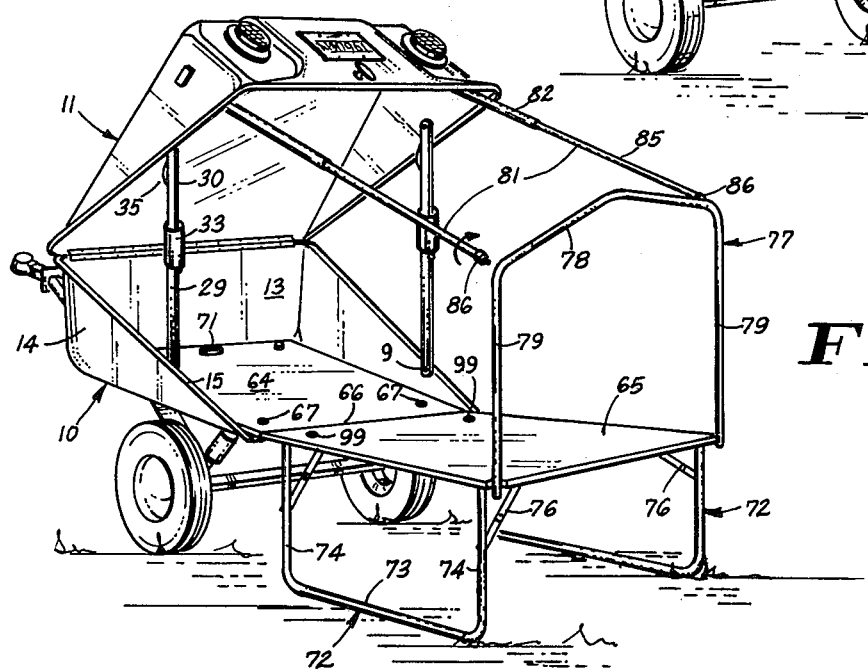
FIG. 3 is another perspective showing the trailer body as fully opened and the supporting framework in erected effective position.

A sleeve 33 is slideable on link 30 and the upper portion of link 29. It is adapted to pass over pivot 31 when links 29 and 30 are in alignment as illustrated in FIG. 3. An abutment 34 is formed on link 29 just below pivot 31 to limit downward movement of sleeve 33 and thus maintain it in position over pivot 31. A spring detent 35 (FIG. 3) is mounted on link 30 above pivot 31 to releaseably hold sleeve 33 in an upper ineffective position.

Figure 5:
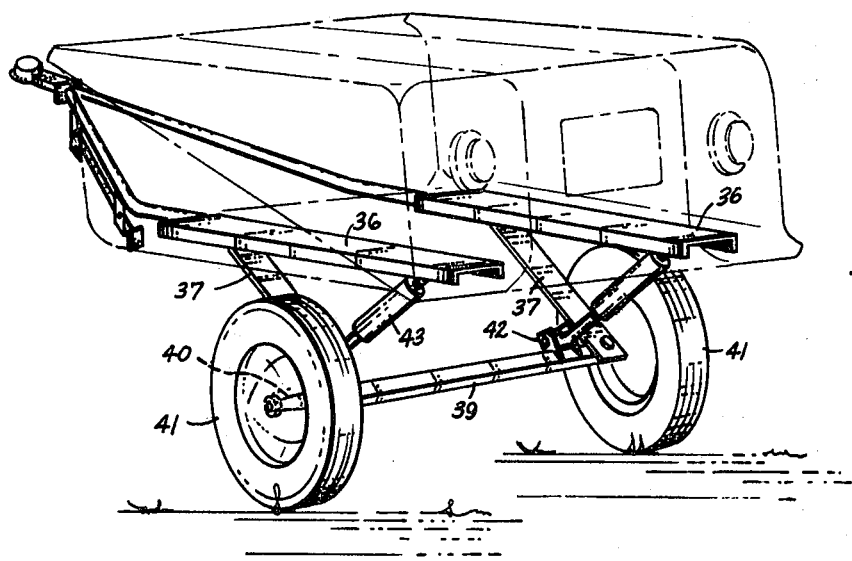
FIG. 5 is a perspective of the wheel suspension with the body illustrated in phantom outline.

Secured to the underface of body bottom 12 are two longitudinally arranged channel bars 36 which are best illustrated in FIG. 5. The wheel suspension is anchored to these channel bars 36 and compriese two leaf springs 37 each of which includes an upper tab 38 (FIG. 12) which is bent from the main body portion of the spring to lie snugly against the respective channel bar. Each of the springs 37 extend downwardly and rearwardly from its connection to a channel bar 36 and at its lower end is connected to a cross-rod or axle 39 which has a spindle 40 extending from each end thereof. A wheel 41 is journaled on each spindle 40. Carried by cross-rod 39 are a pair of brackets 42 each of which is closely adjacent to and on the innerside of a spring 37. A shock absorber 43 has its lower end connected to a bracket 42 and its upper end to a channel bar 36, there being two shock absorbers 43.

Figure 6:
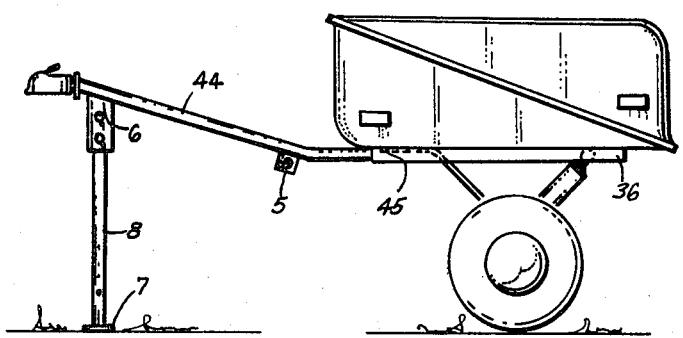
FIG. 6 is a view in side elevation illustrating a vertical support for the hitch.

Referring now more particularly to FIGS. 6, 10, and 11, the hitch for connecting the trailer to the motorcycle will be described.

A pair of struts 44 have their rear ends connected to channel bars 36 as indicated at 45 and extend forwardly and upwardly in divergent relation to a plate 46 (FIG. 11) which is substantially vertical. A pivot pin in the form of a headed bolt 47 passes through an aperture in plate 46 and extends through a plurality of washers 48 and into a semi-cylindrical member 49 with the threaded end of the bolt passing through a lock washer 50 and has a nut 51 screwed thereon to secure the connection. A semi-spherical dome like member 52 is formed on the forward end of semi-cylindrical member 49.

Referring now more particularly to FIG. 10, the luggage rack of a motorcycle is shown at 53. An L shaped member designated generally 54 comprises a horizontal strap 55 which is clamped to rack 53 by a plate 56 and screw bolts 57. L shaped member 54 also includes a vertical strap 58 to which another strap 59 is adjustably mounted thereon by screw bolts 60 which pass through aligned holes in the respective straps. The lower end of strap 59 is formed with a rearwardly directed horizontal flange 61 from which upstands a stud 62 having a semi-spherical head 63. The latter is received in the semi-spherical member 52.

It is evident that the pivot provided by bolt 57 is horizontal and permits relative movement between the motorcycle carrying rack 53 and the trailer through a full 360°. This is highly important when it is considered that a motorcycle in making a turn is often tilted to a wide angle from the vertical and without this pivotal connection would tend to raise one of the wheels 41 from the road surface.

Spherical element 52 and spherical stud 53 provide what is in effect a universal joint which accommodates relative movement between the motorcycle and the trailer on a vertical axis, and while it might accommodate some slight relative movement on a horizontal axis, it would not be sufficient to accommodate the sharp turns aforesaid which are taken care of by the horizontal pivot pin 47.

Figure 4:
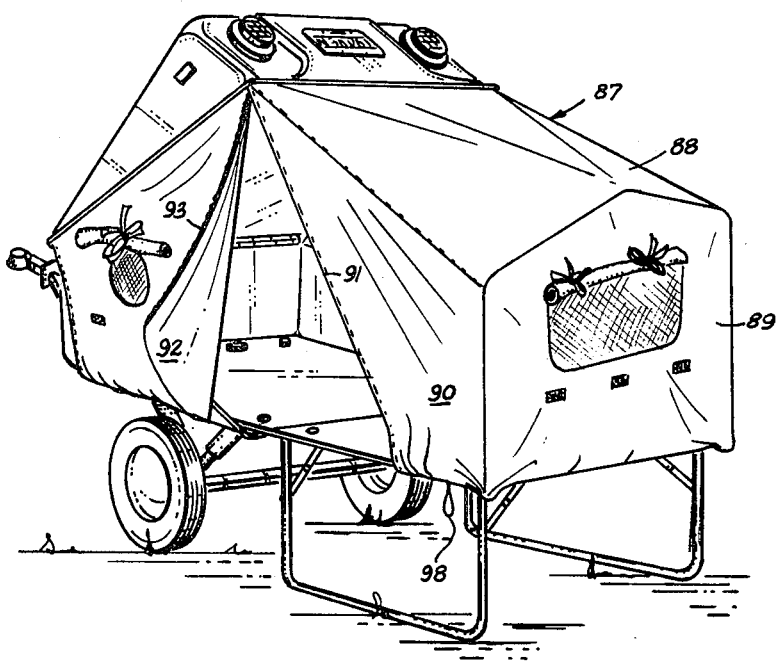
FIG. 4 is another perspective depicting the canopy as applied.

Referring now more particularly to FIGS. 3 and 4, a bed is shown as comprising a forward part 64 and a rear part 65. These parts are of the same size and shape as body bottom 12 and are hingedly connected along the rear edge of forward part 64 as indicated at 66. Forward part 64 is snugly received in lower body part 10 between the side walls 14 and between the front and rear edges of body bottom 12. It is formed with two openings represented at 67.

Referring now for the moment to FIG. 12, it will be noted that the tab 38 on spring 37, a channel bar 36, body bottom 12, and forward bed part 64, are formed with aligned openings, one of which is one of the openings 67 in bed part 64. A lock sleeve 68 passes through these aligned openings and has a flat end 69 formed with teeth which are imbedded in bed part 64. The bore of this sleeve is threaded. A bolt 70 is screwed into sleeve 68 to securely clamp these four parts together. To maintain the accurate alignment of bed part 64 with body bottom 12 during shipping and handling, bed part 64 and body bottom 12 are formed with aligned openings 71 adjacent to the middle of the forward edge thereof and an appropriate fastening device is passes through these aligned openings.

When the rear bed part 65 is swung into the position of FIG. 3 it is supported by two U shaped frames each designated generally 72. Each frame 72 comprises a straight back 73 which engages the ground or other supporting surface and from which upstands two legs 74. The upper end of each leg 74 is pivotally connected to the underside of bed part 65 as indicated at 75 in FIG.

2. When the frames 72 are swung into the vertical supporting position illustrated in FIG. 3, they are held in this position by two collapsable brackets 76 which are so well known that it is believed unnecessary to describe the details thereof.

An upper U shaped frame is designated generally 77. It comprises an upper cross-bar 78 in the form of a wide V and from the ends of which extend legs 79 the lower free ends of which are pivotally connected to the rear edge of bed part 65 as indicated at 80 in FIG. 2. After the frames 72 are swung into supporting position, upper frame 77 is swung upwardly from the position of FIG. 2 into the position of FIG. 3 whereupon two telescoping arms 81 are swung downwardly and outwardly from the position of FIG. 2 and extended to the position of FIG. 3 whereupon they are attached to frame 77 at the upper corners thereof. Each of the telescoping arms comprise an outer tubular member 82 one end of which is pivotally connected to the innerface of a side wall 26 as indicated at 83. Its other end is releasably secured in the position illustrated in FIG. 2 by a spring clasp 84. An inner member 85 is slideably received in the member 82 and, after the latter is swung into the position of FIG. 3, is extended and the connection to frame 39 at 86 is established.

FIG. 4 illustrates a canopy designated generally 87. It comprises a roof 88, an end drape 89 and two sides 90 one of which is slit along a line 91 to provide flap 92 constituting ingress and exit means and which is secured in closed position by a zipper 93 in a well known manner. The forward edge of roof 88 is folded over and secured to a tubular rod 94 shown in FIGS. 9 and 9A. After it has been so secured, the rod 94 with the material of the canopy thereabout is forced into the channel 25 at the lower edge of rear wall 22 of upper body part 11. A pair of thrust rods 95 are then assembled with rod 94 and forced into position in which they exert a thrust on rod 94.

As shown in FIG. 9A each thrust rod 95 has an inturned end 96. Mounted on each end of rod 94 is a ferrule 97 which is particularly adapted to having the inturned end 96 forced there into with a pressed fit to secure the connection. Thus the ferrule 97 may be of a material such as nylon.

Before erection of the canopy the thrust rods 95 are completely disassembled from other elements of the structure. After the inturned ends 96 are positioned in the ferrules 97 the opposite free ends of thrust rods 95 are forced against the front edge portion of top 16 adjacent to the hinge connection at 21 and the side walls. They are so dimensioned that when in this position, a thrust is created on rod 94 which holds it in the channel 25. The lower edge of the rear and side walls of the canopy 87 are then secured to the body bottom and bed part 65 by loop and tie-string 98.

OPERATION OF A PREFERRED EMBODIMENT

While the mode of operation and the manner of erecting the canopy of the above described trailer is believed to be obvious from the illustrations of the drawings and the description of parts set forth above, they are briefly outlined as follows:

It is first noted that the wheel suspension, hitch, and canopy, are disassembleable from the body and that when so disassembled they are susceptible of being packed within the body which is important from the aspect of shipping.

It will be noted that bed part 65 is formed with two bosses 99 which engage the upper end of sleeve 68 when bed part 65 is folded over bed part 64.

Handle 100 on upper body part 11 is engaged by the hand of an operator and upper body part 11 swung upwardly to its limit of movement which is reached when the links of each assembly 28 align. Sleeve 33 is then pulled free of spring 35 and slid downwardly to cover the pivotal points of the links and thus secure the upper body part 11 in the desired tilted position.

Figure 2:
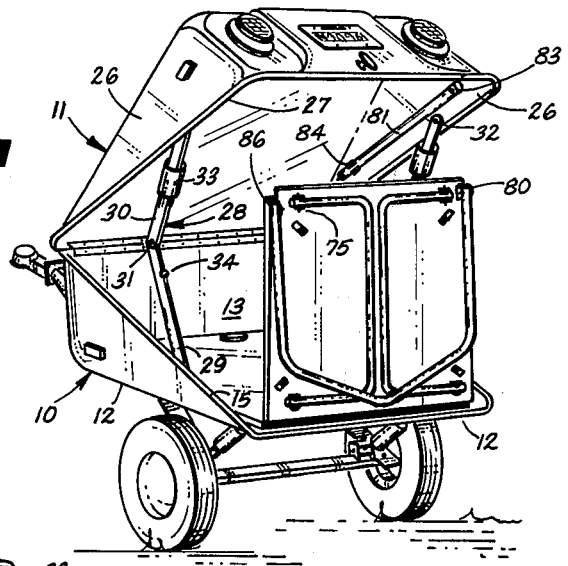
FIG. 2 is another perspective of this trailer body in an intermediate stage of the opening operation and with the canopy omitted.

Bed part 65 is then swung upwardly and rearwardly and at about the position of FIG. 2 of such movement Frames 72 are swung into their effective supporting position. Frame 77 is then swung upwardly into the vertical position of FIG. 3 whereupon telescoping arms 81 are swung downwardly and rearwardly, extended and connected to frame 77. Rod 94 with the material of the canopy roof 88 thereabout, is then forced into channel 25. Thrust rods 95 are then assembled with the outer ends of rod 94 and forced into position in the corners of the body at the front edge of top 16 to generate the thrust required for keeping the rod in the channel. The lower edges of the canopy are then secured to the body bottom and bed part 65 by the loop or tie-string of which loop 98 is representative.

FIG. 6 discloses a post 8 having a foot 7 at its lower end with its upper end being pivotally connected to struts 44 as depicted at 6. When the trailer is in transit post 8 is swung rearwardly and upwardly into a position in which it is detachably held by a pin (not illustrated) which passes through aligned apertures in a bracket 5 and lower end of post 8.

While a preferred specific embodiment of the invention is herein disclosed it is to be clearly understood that the invention is not to be limited to the exact constructions, mechanisms and materials illustrated and described because various modifications may be provided in putting the invention into practice.

What is claimed is:

1. In a motorcycle trailer,
   a. a lower body part comprising:
      I. a bottom defined by a free rear edge, a front edge and side edges,
      II. a front wall upstanding from said front edge and presenting a top edge, and
      III. a pair of triangular side walls upstanding from said side edges and presenting inclined top edges extending from ends of the top edge of said front wall to ends of said rear edge of the bottom;
   b. an upper body part comprising:
      I. a top substantially conforming in size and shape to said bottom of the lower body part and presenting a free front edge, a rear edge and side edges,
      II. a rear wall depending from said rear edge of said top and having a lower edge, and
      III. a pair of triangular side walls depending from the side edges of said top and having inclined lower edges extending from ends of the front edge of the top to ends of the lower edge of said rear wall;
   c. a hinge pivotally connecting the front edge of said top with the top edge of said front wall;
   d. a hitch connected to said lower body part, extending forwardly therefrom, and including means for connecting the hitch to a motorcycle;
   e. a wheel suspension secured to the bottom of said lower body part and including a pair of wheels and spring means interposed between said wheels and said bottom;

f. means for supporting said holding said upper body part in open relation to said lower body part in which said bottom and said top are disposed at an acute angle relative to each other;

g. a bed part of substantially the same size and shape of said bottom as defined by front, rear, and side edges;

h. a hinge connection between the rear edge of said bottom and the front edge of said bed part, said hinge providing for swinging movement of said bed part into a horizontal position in which it aligns with said bottom;

i. collapsible means attached to said bed part for supporting the bed part in said horizontal position;

j. a frame pivotally mounted on said bed part at the rear edge thereof, said frame of U shape comprising a cross-bar in the form of a wide V with legs extending from the ends of said cross-bar to pivotal connections therefor at the rear edges of said bed part;

k. means for supporting said frame from said upper body part when the latter is in said open position, said means comprising a pair of telescoping arms with each arm including an outer tube having one end pivoted to a side wall of the upper body part on the inner face thereof, an inner member slidable in said tubular member and having means at its outer end for detachably connecting it to said frame at the end of the cross-bar of the frame, and a spring clasp on the inner face of each of said side walls receiving said outer tubular members when the telescoping arm thereat is collapsed; and l. a canopy held in effective position by said body parts, said frame and the supporting means for the frame.

2. The motorcycle trailer of claim 1 in which the means for holding the upper body part in open position comprises a pair of link assemblies with each assembly consisting of a lower link having its lower end pivoted to a side wall of the lower body part, an upper link having its upper end pivoted to a side wall of said upper body part with its lower end being pivotally connected to the upper end of said lower link, and releasable means associated with said pivotal connection to hold said links in alignment when said upper body part is in open position.

3. The motorcycle trailer of claim 2 in which the releasable means for holding the links in alignment comprises a sleeve slideable over said links, an abutment on said lower link spaced from said pivotal connection and a spring detent on said upper link above said pivotal connection for holding said sleeve in position spaced from said pivotal connection.

4. The motorcycle trailer of claim 1 in which said bed part is hingedly connected to the rear edge of said bottom through the medium of a second bed part of the same size and shape of said bottom over which it is snugly fitted and secured thereto and the first mentioned bed part is hingedly connected to said last mentioned bed part at its rear edge.

5. The motorcycle trailer of claim 1 in which the wheel suspension comprises a pair of bars secured to the underside of said bottom in spaced relation, a pair of leaf springs each having a tab at its upper end attached to said bars, a cross-bar connected to the lower end of said leaf springs and having a spindle projecting from the ends thereof with one of said wheels being journaled on each spindle and a pair of shock absorbers interposed between said cross-bar and said pair of bars.

6. The motorcycle trailer of claim 1 in which the hitch includes a horizontal pivot pin providing for rotation of a motorcycle relative to the trailer through a full 360° and a universal joint providing for relative movement of the motorcycle and trailer on a vertical pivot line and having a limited amount of movement on a horizontal pivot line.

7. The motorcycle trailer of claim 6 together with means for attaching the universal joint to the luggage rack of a motorcycle.

8. The motorcycle trailer of claim 1 in which the supporting means for the bed part comprises a pair of U shaped frames each having a back for ground engagement and a pair of legs upstanding from the ends of said backs with the upper ends of the legs being pivotally connected to said bed part and collapsable braces for holding said frames in effective position, said backs of said frames being parallel to the side edges of said bed part.

9. The motorcycle trailer of claim 1 in which the rear wall of said upper body part is formed with an inwardly opening channel parallel and adjacent to the lower edge thereof and the canopy includes a roof which when in effective position presents a front edge at the lower edge of said rear wall together with a rod having a portion of said roof at said front edge wrapped thereabout and received in said channel and a pair of thrust rods each having one end connected to said rod and its other end bearing against the front wall of said body whereby thrust is created which holds said rod with a portion of the roof thereabout in said channel.

* * * * *